United States Patent
Park et al.

(10) Patent No.: US 8,630,215 B2
(45) Date of Patent: Jan. 14, 2014

(54) METHOD, APPARATUS AND COMPUTER READABLE MEDIUM FOR REDUCING POWER-CONSUMPTION OF WIRELESS NETWORK DEVICE

(75) Inventors: Jong-ho Park, Suwon-si (KR); Ji-sang Kim, Yongin-si (KR); Jin-min Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 809 days.

(21) Appl. No.: 12/273,803

(22) Filed: Nov. 19, 2008

(65) Prior Publication Data

US 2009/0180415 A1    Jul. 16, 2009

(30) Foreign Application Priority Data

Jan. 15, 2008    (KR) .................. 10-2008-0004430

(51) Int. Cl.
*G08C 17/00*    (2006.01)
(52) U.S. Cl.
USPC ......................................................... 370/311

(58) Field of Classification Search
USPC ........................... 370/474, 401, 311; 709/250
See application file for complete search history.

(56) References Cited

U.S. PATENT DOCUMENTS

| | | | |
|---|---|---|---|
| 6,606,709 B1 * | 8/2003 | Connery et al. | 726/14 |
| 6,965,941 B2 * | 11/2005 | Boucher et al. | 709/230 |
| 7,292,545 B2 * | 11/2007 | Maki et al. | 370/311 |
| 7,895,309 B2 * | 2/2011 | Belali et al. | 709/223 |
| 8,325,610 B2 * | 12/2012 | Fischer | 370/236 |
| 2004/0165539 A1 | 8/2004 | Huckins | |

FOREIGN PATENT DOCUMENTS

| | | |
|---|---|---|
| KR | 10-2005-0101342 | 10/2005 |
| KR | 1020070020850 | 2/2007 |

* cited by examiner

*Primary Examiner* — Chandrahas Patel
(74) *Attorney, Agent, or Firm* — Staas & Halsey LLP

(57) ABSTRACT

A method, an apparatus, and a computer-readable medium to reduce power consumption of a wireless network device, the method including: receiving a packet; and determining whether to transmit the received packet to a host based on a state of the host and a packet transmission standard set for the host. Accordingly, it is possible to extend a period of use of a wireless portable terminal using an Internet protocol (IP)-based wireless network.

28 Claims, 4 Drawing Sheets

METHOD, APPARATUS AND COMPUTER READABLE MEDIUM FOR REDUCING POWER-CONSUMPTION OF WIRELESS NETWORK DEVICE

CROSS-REFERENCE TO RELATED APPLICATION

This application claims the benefit of Korean Patent Application No. 2008-4430, filed Jan. 15, 2008, in the Korean Intellectual Property Office, the disclosure of which is incorporated herein by reference.

BACKGROUND OF THE INVENTION

1. Field of the Invention

Aspects of the present invention relate to a method, an apparatus, and a computer-readable medium to reduce power consumption of a wireless network device and to enable an extension of a period of use of a wireless portable terminal using an Internet protocol (IP) based wireless network.

2. Description of the Related Art

In a general voice-based mobile communication network environment (such as a code division multiple access (CDMA) network), a wireless portable terminal is always connected to a communication network. Accordingly, a user of the wireless portable terminal can always use desired operations of a wireless portable terminal. Therefore, technologies to extend a period of use of a wireless portable terminal and to manage a power supply by protocol definition and the like have been developed.

On the other hand, in an Internet Protocol (IP)-based portable internet environment (such as Wireless Broadband Internet (WiBro) and World Interoperability for Microwave Access (WiMAX)) and a wireless network environment (such as a wireless local area network (WLAN)), a wireless portable terminal is connected to a universal communication network such as the Internet.

FIG. 1 is a view to explain a conventional IP-based wireless network system. Referring to FIG. 1, the conventional IP-based wireless network system includes an Internet 100 connected to various types of IP-based devices 110, a wireless repeater 120 connecting a wireless portable terminal 130 with the Internet 100 to enable communication therebetween, and the wireless portable terminal 130 communicating through the wireless repeater 120 with the IP-based devices 110 connected to the Internet 100.

However, if the wireless portable terminal 130 is connected to the Internet 100 through the wireless repeater 120 at all times, the wireless portable terminal 130 may too frequently receive a packet transmitting and receiving requests. Accordingly, since the wireless portable terminal 130 processes and responds to an undesired packet received from the various types of IP-based devices 110, a transmission standard to reduce power consumption (such as a sleep state) cannot be substantially used. Even though the wireless portable terminal 130 enters the sleep state, the sleep state is cancelled if the transmitting or the receiving of a packet occurs. Therefore, an approach to connect the wireless portable terminal 130 to the Internet 100 at all times for communication and to maintain the sleep state for a long time is needed.

SUMMARY OF THE INVENTION

Aspects of the present invention provide a method, an apparatus, and a computer-readable medium to reduce power consumption of a wireless network device for a wireless portable terminal using an Internet protocol (IP)-based wireless network, to enable communication with the Internet at all times, and to maintain a sleep state of the wireless network device. Aspects of the present invention also provide a method, an apparatus, and a computer-readable medium to reduce power consumption of a wireless network device terminal, and to provide different types of processing environments for different packets received from the Internet according to a state of the wireless portable terminal using an IP-based wireless network.

According to an aspect of the present invention, there is provided a power-consumption reducing method of a wireless network device, the method including: receiving a packet; and determining whether to transmit the received packet to a host based on a state of the host and a packet transmission standard set for the host.

The method may further include receiving state information regarding the state of the host from the host and storing the state information, and the determining of whether to transmit the received packet may include determining whether to transmit the received packet to the host based on the packet transmission standard if the state of the host, according to the stored state information, is a sleep state.

The method may further include changing the state of the host to a wake-up state if it is determined to transmit the received packet to the host; and maintaining the host in the sleep state if it is determined to not transmit the received packet.

The method may further include transmitting the received packet to the host if it is determined that the state of the host is a wake-up state.

The information regarding the state may be received from the host when the state of the host is changed.

The transmission standard may be a transmission control protocol/user datagram protocol (TCP/UDP) port number.

The method may further include transmitting the received packet to the host after the state of the host is changed to the wake-up state.

According to another aspect of the present invention, there is provided a power-consumption reducing apparatus of a wireless network device, the apparatus including: a packet receiver to receive a packet through a wireless network; and a filter to determine whether to transmit the received packet to a host based on a packet transmission standard set for the host.

According to another aspect of the present invention, there is provided a computer-readable recording medium having recorded thereon a program to execute a power-consumption reducing method of a wireless network device, the method including: receiving a packet; and determining whether to transmit the received packet to a host based on a packet transmission standard set for the host.

According to yet another aspect of the present invention, there is provided a power-consumption reducing method of a wireless network device, the method including: receiving a packet; and determining whether to change a state of the host based on the received packet and a packet transmission standard set for the host.

According to still another aspect of the present invention, there is provided a power-consumption reducing method of a wireless network device, the method including: receiving a packet; and determining whether to transmit the received packet to a host that is in a sleep state based on a packet transmission standard set for the host.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
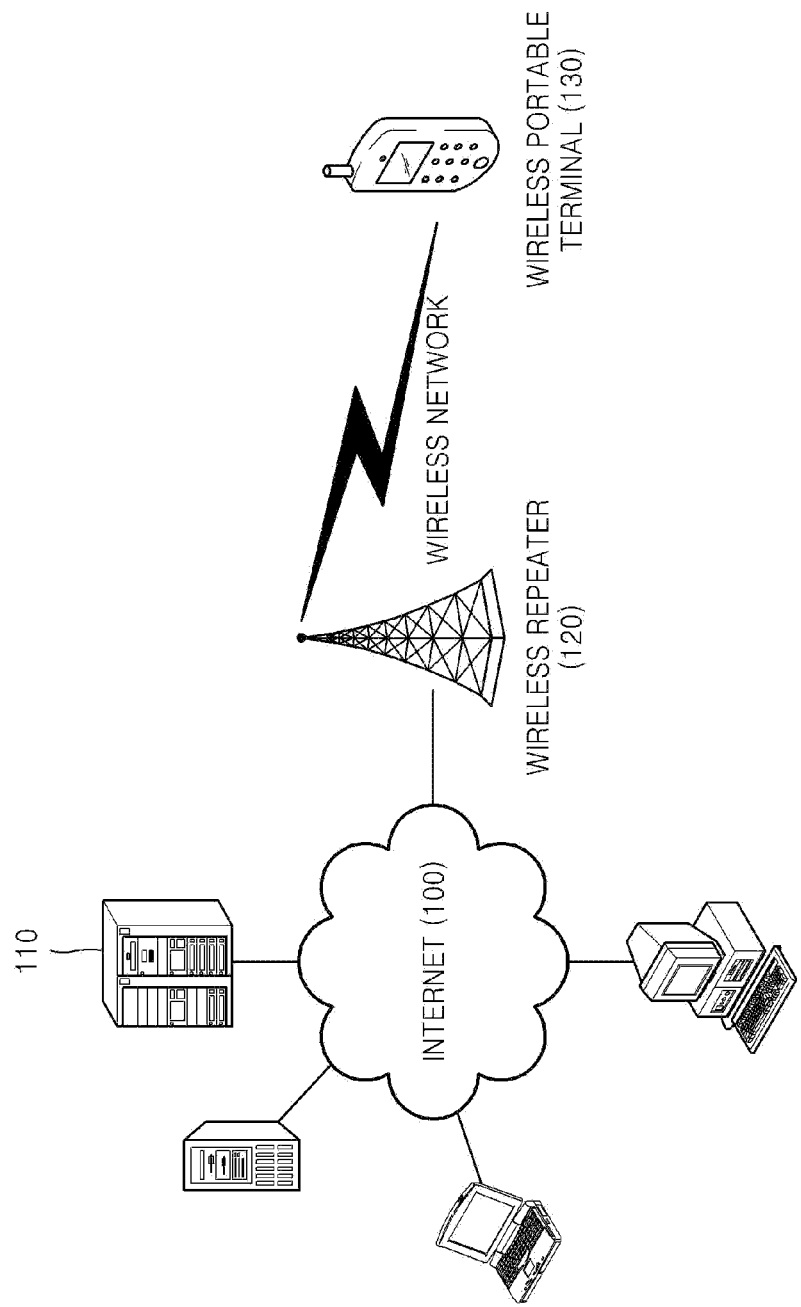
FIG. 1 is a view to explain a conventional IP-based wireless network system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
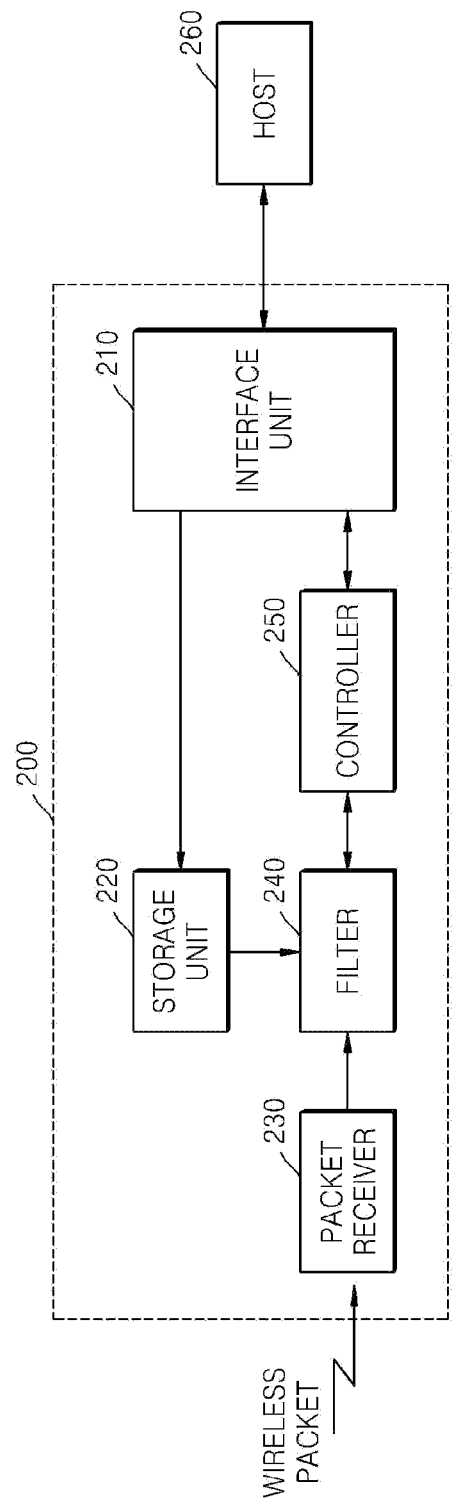
FIG. 2 is a block diagram illustrating a power-consumption reducing apparatus of a wireless network device according to an embodiment of the present invention.

FIG. 2 is a block diagram illustrating a power-consumption reducing apparatus 200 of a wireless network device according to an embodiment of the present invention. Referring to FIG. 2, the power-consumption reducing apparatus 200 includes an interface unit 210, a storage unit 220, a packet receiver 230, a filter 240, and a controller 250. As an example, the wireless network device may be a wireless repeater 120 or a wireless portable terminal 130, as shown in FIG. 1. It is assumed that the power-consumption reducing apparatus 200 of FIG. 2 is built into the wireless portable terminal 130, though aspects of the present invention are not limited thereto. For example, a power-consumption reducing apparatus is built into the wireless repeater 120 according to other aspects of the present invention will be described later with reference to FIG. 4.

The host 260 is an integrated part of the wireless portable terminal for processing application programs. The host 260 is a processor-based device including a processor (not shown), a memory (not shown), and an interface (not shown) to communicate with an external device. The host 260 is connected to the interface 210 in the power-consumption reducing apparatus 200. The host 260 enters a sleep state and performs a power saving operation if the wireless portable terminal is not used. On the other hand, the host 260 enters a wake-up state and performs various operations if the wireless portable terminal is used. While the wireless portable terminal is in the sleep state, the host 260 cannot transmit to and receive from the power-consumption reducing apparatus 200. The sleep state reduces power consumption of the wireless portable terminal and a waste of resources resulting from communications with the wireless repeater. Since various methods of changing the state of the host 260 are well known to those of ordinary skill in the art, a detailed description thereof will be omitted here.

When the host 260 changes from the wake-up state to the sleep state or from the sleep state to the wake-up state, the host 260 transmits information regarding the changed state (hereinafter, referred to as "state information") to the storage unit 220 through the interface unit 210. The transmitted state information is stored in the storage unit 220.

The host 260 inputs a transmission standard of a packet received from a user of the wireless portable terminal and transfers the inputted transmission standard to the filter 240 through the interface unit 210 and the controller 250. However, it is understood that aspects of the present invention are not limited thereto. For example, the transmission standard may be a pre-set default by a manufacturer of the wireless portable terminal or an operating system. The packet transmission standard is stored in the filter 240. The transmission standard set up by the host 260 includes information on whether the packet that the power-consumption reducing apparatus 200 receives from an outside device is a packet desired by a user. If the packet desired by the user is received, the power-consumption reducing apparatus 200 changes the host 260 to the wake-up state to transmit the packet to the host 260. On the other hand, if a packet undesired by the user is received, the power-consumption reducing apparatus 200 discards the packet and continues to maintain the host 260 in the sleep state. According to other aspects, the packet is stored in the storage unit 220, rather than discarded, and transmitted to the host 260 when the host is eventually in the wake-up state.

As described above, a user of the wireless portable terminal inputs the transmission standard of the packet through the host 260. For example, the user of the wireless portable terminal has previously set information on a packet that the host 260 is to receive, and the state of the host 260 is changed to the wake-up state only if the previously set packet is received.

The interface unit 210 interfaces the host 260 with the power-consumption reducing apparatus 200. In more detail, the interface unit 210 receives the state information from the host 260 and transfers the state information to the storage unit 220. Also, the interface unit 210 receives the transmission standard of the packet, input by the host 260, and transfers the transmission standard to the controller 250 through the filter 240. The interface unit 210 transfers a control signal of controller 250 to change the host 260 to the wake-up state.

The storage unit 220 stores the state information of the host 260 received from the host 260 through the interface unit 210. Therefore, the power-consumption reducing apparatus 200 can determine a current state of the host 260 by using the state information stored in the storage unit 220. For example, the storage unit 220 may be a state machine.

The packet receiver 230 receives a packet through a wired and/or a wireless network and transmits the received packet to the filter 240. For example, the packet receiver 230 may be a physical layer/medium access control (PHY/MAC) chip. The packet receiver 230 maintains a connection to the network in order to communicate with devices in the network even though the host 260 is in the sleep state.

The filter 240 determines a state of the host 260 by receiving state information of the host 260 from the storage unit 220. If the host 260 is in the sleep state, the filter 240 determines whether to transmit the received packet to the host 260 or to discard the received packet based on the transmission standard of the packet. Accordingly, the filter 240 transmits the packet determined to be transmitted to the controller 250. The transmission standard of the packet is inputted through the host 260 by the user and is stored in the filter 240. For example, the transmission standard of the packet may be a transmission control protocol/user datagram protocol (TCP/UDP) port number. In this case, if the host is in the sleep state, the filter 240 outputs the packet received through a specific port number to the controller 250, and the controller 250 transmits the packet to the host 260 through the interface unit 210. Then, the packet that is received through the port number but not stored according to a transmission standard of the packet is discarded. The controller 250 may receive state information of the host 260 from the filter 240 or the storage unit 220.

If the host 260 is in the wake-up state, the filter 240 may determine to transmit the packet received regardless of the transmission standard to the host 260. However, aspects of the present invention are not limited thereto. For example, according to other aspects, if the host 260 is in the wake-up state, the filter 240 filters a packet according to a transmission standard of a packet in regard to the wake-up state, which may be different from a transmission standard of a packet in regard to the sleep state, and transmits the packet to the host 260 accordingly.

The filter 240 filters the received packet based on a current state of the host 260 and a transmission standard of a packet and transmits the packet selected by filtering to the host 260. If the filter 240 determines to transmit the received packet to the host 260, the controller 250 transfers a control signal to change the state of the host 260 to the wake-up state to the host 260 through the interface unit 210. On the contrary, if the filter 240 determines to discard the received packet, the controller 250 maintains the host 260 in the sleep state.

The controller 250 transmits an output of the filter 240 to the host 260 through the interface unit 210. Therefore, if the host 260 is in the wake-up state, the controller 250 may transmit all received packets to the host 260. If the host is in the sleep state, the controller 250 may transmit the packet filtered by the filter 240 among the received packets. The controller 250, however, changes the host to the wake-up state when transmitting a packet to the host 260.

According to aspects of the present invention as described above, different types of processing environments may be provided to different packets received from an Internet (not shown) according to whether the host 260 of the wireless portable terminal is in the sleep state or in the wake-up state. For example, a user may communicate in the wake-up state without limitation to types of packets (for example, Internet protocol television (IPTV) watching and downloading using broadcasting), and power consumption of the wireless portable terminal may be reduced in the method of receiving only push e-mail in the sleep state.

Figure 3:
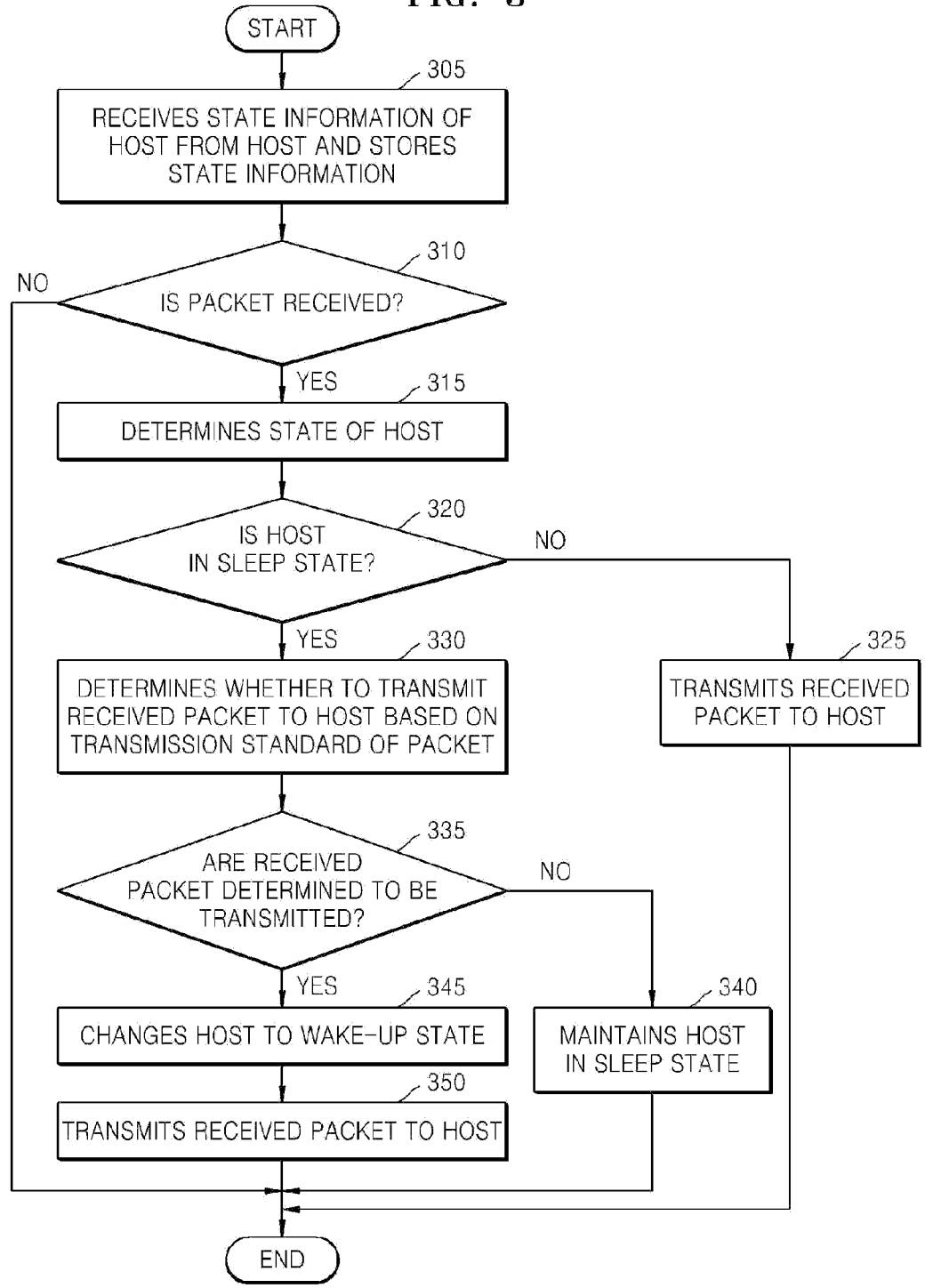
FIG. 3 is a flowchart illustrating a power-consumption reducing method of a wireless network device according to an embodiment of the present invention.

FIG. 3 is a flowchart illustrating a power-consumption reducing method of a wireless network device according to an embodiment of the present invention. Referring to FIG. 3, a power-consumption reducing apparatus receives state information of a host from a host and stores the state information in operation 305. The host transmits state information to the power-consumption reducing apparatus when a state of the host is changed. Furthermore, the received state information of the host may be stored in a state machine built into the power-consumption reducing apparatus. The host updates the latest state information to the state machine.

The power-consumption reducing apparatus determines whether a packet is received through a network in operation 310. If the packet is not received, the method ends. However, if the packet is received, the power-consumption reducing apparatus determines a state of the host based on state information of the host in operation 315.

Whether the host is in a sleep state is determined in operation 320. If the host is determined to be in the sleep state, the power-consumption reducing apparatus determines whether to transmit the received packet to the host or to discard the received packet based on the transmission standard of the packet in operation 330. The transmission standard of the packet may be inputted through the host by the user. For example, the transmission standard of the packet may be a TCP/UDP port number. If the host is determined to not be in the sleep state, the power-consumption reducing apparatus transmits the received packet to the host in operation 325.

Whether the received packet is to be transmitted to the host is determined in operation 335. If the received packet is determined to be transmitted to the host, the power-consumption reducing apparatus changes the state of the host to the wake-up state in operation 345. Then, the power-consumption reducing apparatus transmits the received packet to the host in operation 350. Conversely, if the received packet is determined to not be transmitted to the host, the power-consumption reducing apparatus maintains the host in the sleep state and discards the received packet in operation 340.

Figure 4:
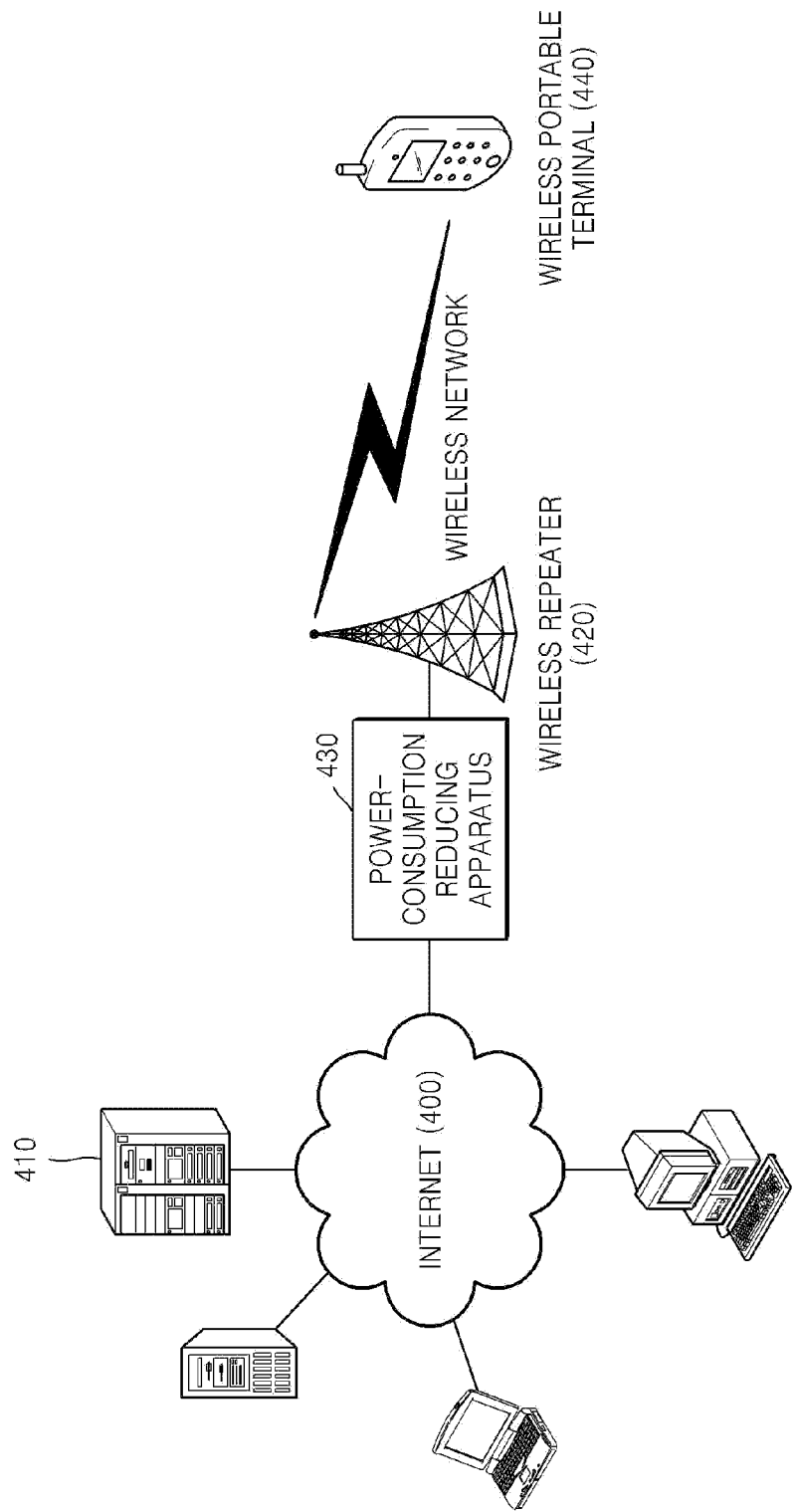
FIG. 4 is a block diagram illustrating a power-consumption reducing apparatus of a wireless network device according to another embodiment of the present invention.

FIG. 4 is a block diagram illustrating a power-consumption reducing apparatus of a wireless network device according to another embodiment of the present invention. Referring to FIG. 4, the power-consumption reducing apparatus 430 of the wireless network device is provided in front of a wireless repeater 420. In other words, an Internet 400 connected to IP-based devices 410 is connected to the wireless repeater 420 through the power-consumption reducing apparatus 430. The wireless repeater 420 is connected to a wireless portable terminal 440 through the wireless network.

The power-consumption reducing apparatus 430 includes an interface (not shown), a storage unit (not shown), a packet receiver (not shown), a filter (not shown), and a controller (not shown), similar to those illustrated in FIG. 2. The power-consumption reducing apparatus 430 according to the present embodiment may be an integrated part of the wireless repeater 420.

The wireless portable terminal 440 transfers state information to the power-consumption reducing apparatus 430 through the wireless repeater 420. A user of the wireless portable terminal 440 may input a transmission standard of a packet using the host of the wireless portable terminal 440, and the inputted transmission standard of a packet is transmitted to the filter of the power-consumption reducing apparatus 430 through the wireless repeater 420. The power-consumption reducing apparatus 430 may transmit a control signal or a packet to change a state of the wireless portable terminal 440 through the wireless repeater 420. As described above, it is possible to reduce power consumption of the wireless portable terminal 440 by providing the power-consumption reducing apparatus 430 in front of the wireless repeater 420.

According to aspects of the present invention, by determining whether to transmit a received packet to the host when the host is in the sleep state, it is possible to maintain a wireless portable terminal in the sleep state for as long as possible. Additionally, according to aspects of the present invention, by transmitting the received packet to the host based on a state of the host and a transmission standard set through the host by a user, it is possible to provide different types of processing environments for different packets received from the Internet according to a state of the wireless portable terminal.

Aspects of the present invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A power-consumption reducing method of a wireless network device, the method comprising:
   receiving a packet from an outside device;
   receiving, from a host, a packet transmission standard set for the host and state information indicating a wake-up state or a sleep state of the host and being transmitted by the host when a current state of the host is changed;
   determining the current state of the host, based on the received state information;
   determining whether to transmit the received packet to the host based on the determined current state of the host and the packet transmission standard set for the host; and
   changing the current state of the host to the wake-up state if determined to transmit the received packet to the host,
   wherein the packet transmission standard includes information about the packet which the host needs to receive, even if the host is in the sleep state.

2. The method as claimed in claim 1, further comprising:
   receiving the state information regarding the state of the host from the host and storing the state information,
   wherein the determining of whether to transmit the received packet comprises determining whether to transmit the received packet to the host based on the packet transmission standard if the state of the host, according to the stored state information, is the sleep state.

3. The method as claimed in claim 2, further comprising: maintaining the host in the sleep state if determined to not transmit the received packet.

4. The method as claimed in claim 3, further comprising transmitting the received packet to the host after the state of the host is changed to the wake-up state.

5. The method as claimed in claim 2, wherein the state information is received from the host when the state of the host is changed.

6. The method as claimed in claim 2, further comprising transmitting the received packet to the host if the state of the host is the wake-up state.

7. The method as claimed in claim 6, wherein the determining of whether to transmit the received packet comprises determining to transmit the received packet to the host if the state of the host is the sleep state and the received packet is Push-Mail.

8. The method as claimed in claim 1, wherein the packet transmission standard is a transmission control protocol/user datagram protocol (TCP/UDP) port number.

9. The method as claimed in claim 1, wherein the determining of whether to transmit the received packet comprises determining to transmit the received packet to the host if the state of the host is the sleep state and the received packet is Push-Mail.

10. The method as claimed in claim 1, wherein the wireless network device is a wireless portable terminal.

11. The method as claimed in claim 1, wherein the wireless network device is a wireless repeater.

12. A non-transitory computer-readable recording medium encoded with the method of claim 1 and implemented by at least one computer.

13. A power-consumption reducing apparatus of a wireless network device, the apparatus comprising:
   a packet receiver to receive a packet from an outside device through a wireless network;
   a storage unit to receive and to store state information indicating a wake-up state or a sleep state of the host, the received state information being transmitted by the host when a current state of the host is changed;
   a filter to receive, from a host, a packet transmission standard set for the host, to determine the current state of the host, and to determine whether to transmit the received packet to the host based on the current state of the host and the packet transmission standard set for the host; and
   a controller to change the current state of the host to the wake-up state if the filter determines to transmit the received packet to the host,
   wherein the packet transmission standard includes information about the packet which the host needs to receive, even if the host is in the sleep state.

14. The apparatus as claimed in claim 13, further comprising:
   an interface unit to receive the state information regarding the state of the host from the host,
   wherein the filter determines whether to transmit the received packet to the host based on the packet transmission standard if the state of the host, according to the stored state information, is the sleep state.

15. The apparatus as claimed in claim 14, wherein the storage unit is a state machine, and the packet receiver is a physical layer/medium access control (PHY/MAC) chip.

16. The apparatus as claimed in claim 14, wherein the host transmits the state information to the storage unit when the state of the host is changed.

17. The apparatus as claimed in claim 14, further comprising a controller to maintain the host in the sleep state via the interface unit if the filter determines to not transmit the received packet.

18. The apparatus as claimed in claim 17, wherein the controller transmits the received packet to the host via the interface unit if the state of the host is the wake-up state.

19. The apparatus as claimed in claim 17, wherein the storage unit stores the received packet if the filter determines to not transmit the received packet.

20. The apparatus as claimed in claim 18, wherein the filter determines to transmit the received packet to the host if the state of the host is the sleep state and the received packet is Push-Mail.

21. The apparatus as claimed in claim 13, wherein the filter determines to transmit the received packet to the host if the state of the host is the sleep state and the received packet is Push-Mail.

22. The apparatus as claimed in claim 13, wherein the wireless network device is a wireless portable terminal.

23. The apparatus as claimed in claim 13, wherein the wireless network device is a wireless repeater.

24. The apparatus as claimed in claim 13, wherein the filter stores the packet transmission standard.

25. The apparatus as claimed in claim 13, wherein the packet transmission standard is a transmission control protocol/user datagram protocol (TCP/UDP) port number.

26. A power-consumption reducing method of a wireless network device, the method comprising:
   receiving a packet from an outside device;
   receiving, from a host, a packet transmission standard set for the host and state information indicating a wake-up state or a sleep state of the host and being transmitted by the host when a current state of the host is changed;

determining the current state of the host, using the received state information; and determining whether to change the determined current state of the host based on the received packet and the packet transmission standard set for the host, wherein the packet transmission standard includes information about the packet which the host needs to receive, even if the host is in the sleep state.

27. The method as claimed in claim 26, wherein the determining of whether to change the determined current state of the host comprises:

determining whether to change the current state of the host from the sleep state to the wake-up state if the received packet corresponds to the packet transmission standard; and determining to maintain the current state of the host in the sleep state if the received packet does not correspond to the packet transmission standard.

28. A non-transitory computer-readable recording medium encoded with the method of claim 26 and implemented by at least one computer.

* * * * *